United States Patent [19]

Gaston

[11] Patent Number: 5,493,825
[45] Date of Patent: Feb. 27, 1996

[54] LIGHT-TRANSMISSIVE DECKING ASSEMBLY

[75] Inventor: Johannes N. Gaston, Minnetonka, Minn.

[73] Assignee: Clear-Deck Systems, Inc., Minnetonka, Minn.

[21] Appl. No.: 229,561

[22] Filed: Apr. 19, 1994

[51] Int. Cl.⁶ .................................................... E04C 1/34
[52] U.S. Cl. ........................... 52/200; 52/309.1; 52/306; 52/650.3; 52/18
[58] Field of Search ............................. 52/200, 306, 74, 52/650.3, 712, 18, 309.1; 47/29, 17 SC, DIG. 6

[56] References Cited

U.S. PATENT DOCUMENTS

| | | |
|---|---|---|
| 290,886 | 12/1883 | Hyatt. |
| 312,269 | 2/1885 | Higley. |
| 996,729 | 7/1911 | Roberts. |
| 1,787,371 | 12/1930 | Heaton. |
| 2,179,863 | 11/1939 | Rolph .................................. 52/309.1 |
| 2,457,619 | 12/1948 | Yocum. |
| 3,978,635 | 9/1976 | Theault ................................. 52/18 X |
| 4,212,291 | 7/1980 | Erb. |
| 4,303,969 | 12/1981 | Hamilton et al.. |
| 4,329,739 | 5/1982 | Loebner. |
| 4,823,529 | 4/1989 | Canfield et al. ...................... 52/712 X |
| 5,052,164 | 10/1991 | Sandow. |
| 5,163,257 | 11/1992 | Crowell .................................. 52/200 |

*Primary Examiner*—Carl D. Friedman
*Assistant Examiner*—Beth A. Aubrey
*Attorney, Agent, or Firm*—Brian J. Laurenzo; Kent A. Herink; James R. Foley

[57] ABSTRACT

A light-transmissive decking section for use in a decking assembly for supporting a user while allowing the user to receive light through the decking assembly. The light-transmissive decking section is provided with a light-transmissive top section. The transmissive properties of the light-transmissive decking section increase the aesthetic appeal of the decking assembly and allow the light to be used below the decking assembly for illumination and heat. The light-transmissive decking section may also be provided with a light or a solar panel to alternatively emanate light or generate power from ambient light.

22 Claims, 12 Drawing Sheets

LIGHT-TRANSMISSIVE DECKING ASSEMBLY

BACKGROUND OF THE INVENTION

The present invention relates generally to decking apparatuses, and, in particular, to a decking apparatus having a light-transmissive decking section for allowing light transmission through the decking apparatus while supporting the weight of a user.

Decks are not only an aesthetically pleasing addition to a building, but increase both the useable space and value of the building. Many decks extend from the second floor of a building to not only add additional space to the second floor, but also to provide shelter for the area immediately below the deck. Decks are typically constructed with a sub-structure consisting of vertical beams and horizontal joists to which is secured a decking consisting of a plurality of decking sections.

Decking is usually made of wood, which allows very little light to pass through the decking. Accordingly, not only does the deck make it difficult for a person being on the deck to view activity below the deck, but the area below the deck is typically underlit, often requiring the use of electric light even during daytime hours.

Although it would be possible to-provide a hole in the decking to allow the transmission of light, such a hole would be dangerous for small children and would pose a hazard to users underneath the deck who might be injured by objects falling through such a hole. While it might be possible to provide the deck with a standard skylight structure, such structures are very expensive and generally too weak to support the weight of a user.

The difficulties encountered heretofore are substantially eliminated by the present invention.

Accordingly, it is an object of the present invention to provide a decking assembly having a light-transmissive portion which allows light to pass through the decking assembly to illuminate the area below the decking assembly. This illumination eliminates the need for supplemental lighting and the energy consumption associated therewith.

Another object of the present invention is to provide a decking assembly which allows light to pass through the decking assembly and into a habitable structure, where the light may be used to heat and illuminate the structure. Depending on the orientation of the light-transmissive portion of the decking assembly, the decking assembly may be constructed to allow more light into the structure during the winter months and less light into the structure during the summer months, thereby saving energy costs.

Still another object of the present invention is to provide decking sections which may be fitted on to existing decks without the need for reconstruction of the deck. This "retrofit" feature allows the benefits of the present invention to be captured by users with existing decks.

A further object of the present invention is to provide a decking assembly which allows a user supported by the decking assembly to view activity below the decking assembly.

Yet another object of the present invention is to provide a decking assembly which provides for the transmission of light through the decking assembly and supports the weight of a user. This feature prevents the light-transmissive properties of the decking assembly from decreasing the usable space of the decking assembly.

Other objects of the invention include providing a decking assembly which is weather resistant and easy to care for. The decking assembly is also modular so the decking sections are easily interchangeable with currently existing lumber sections which make up the vast majority of preexisting decking.

These and other objects of the invention will become apparent upon reference to the following specification, drawings and claims.

SUMMARY OF THE INVENTION

A light-transmissive decking section is provided for supporting a user, wherein the light-transmissive decking section comprises a substantially planar top section of a uniform width which is constructed of a light-transmissive material which allows light to pass through the decking section. The top section has a first end and a second end with a first edge, and a second edge located transversely of the ends. The decking section also has first and second side sections each having a first end and a second end, and being co-extensive in length with the top section. The first and second side sections are operably connected to the top section along the first edge and second edge of the top section. The first and second side sections buttress the top section against lateral displacement.

Preferably, the light-transmissive decking section is part of a decking assembly which supports a user and which allows light to pass through the decking assembly to the user. The decking assembly comprises a deck supported above the ground and capable of supporting the light-transmissive decking section. The decking assembly is provided with means for supporting the top section of the light-transmissive decking section against the deck to prevent displacement of the top section when weight is applied to the top section. The supporting means is a bracket which engages the light-transmissive decking section along both sides and the top section. The light-transmissive decking section is preferably light-transmissive to allow maximum light transmission through the section. The light-transmissive decking section is of a modular polycarbonate composition to allow existing decks to be retro-fitted with light-transmissive sections, thereby converting existing decks into the decking assembly of the present invention.

DETAILED DESCRIPTION OF THE DRAWINGS

Figure 1:
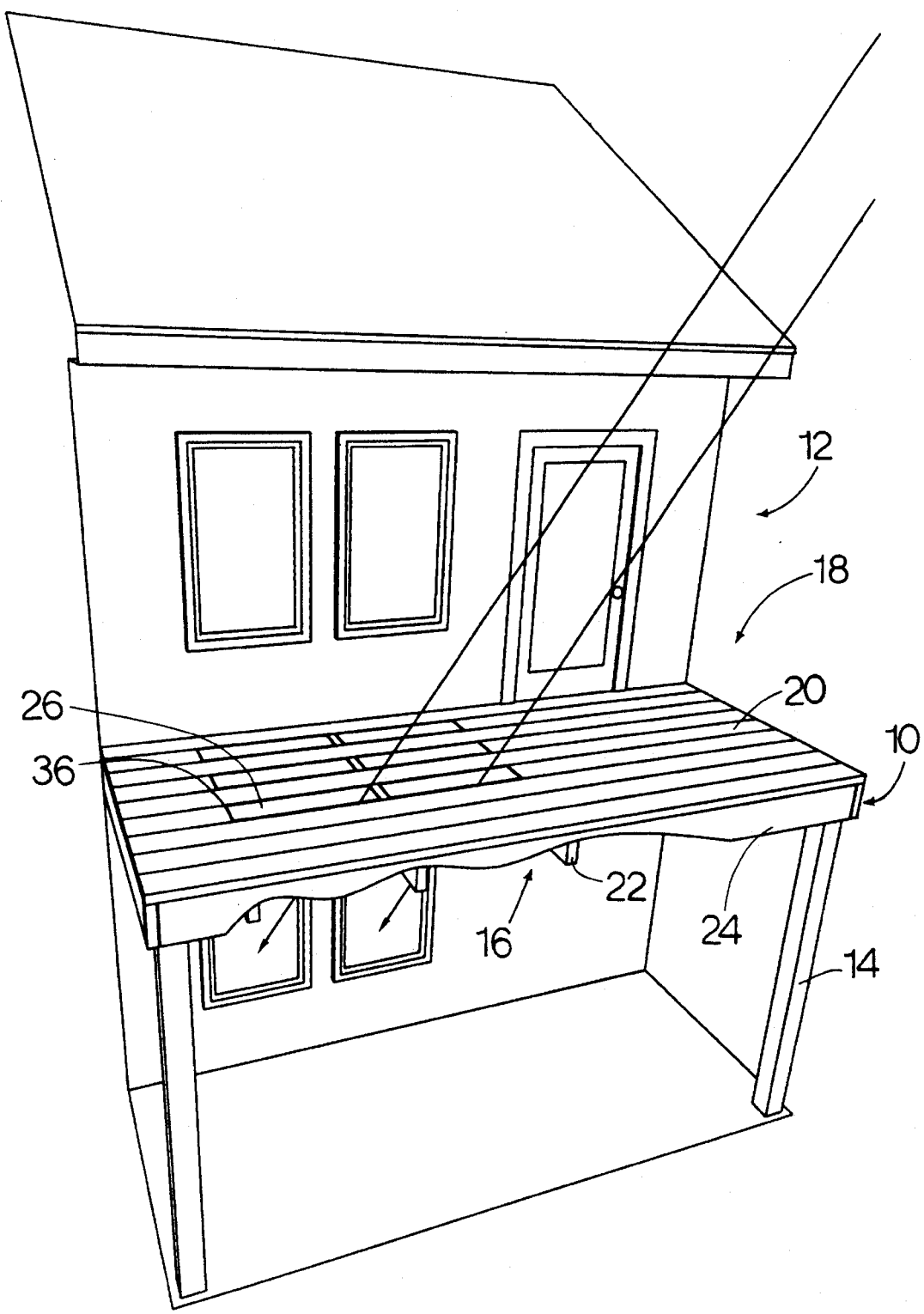
FIG. 1 is a perspective view of the decking assembly of the present invention showing light rays being transmitted through the light-transmissive sections of the decking assembly.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

The present inventive decking assembly 10 is shown attached to a typical two-story home 12 in FIG. 1. The decking assembly 10 includes a pair of vertical beams 14 supporting a plurality of joists 16 upon which is laid a decking 18. While the decking assembly 10 may be constructed from numerous materials, it is desirable to use a decay resistant wood such as Cypress, Redwood or Cedar. The natural beauty of these woods also make them ideal for the decking 18. Conversely, stronger structural woods such as Douglas Fir or Western Larch may be used for the joists 16 since aesthetics are not as great of a concern.

The decking assembly 10 has two kinds of joists 16. A longitudinal joist 24 connects the two vertical beams 14, and a plurality of transverse joists 22 are secured between the home 12 and the longitudinal joist 24. The decking 18 comprises a plurality of wood decking sections 20 (FIG. 1). The decking sections 20 are secured to the transverse joists 22. The decking sections 20 are preferably 2×6s (1.5 in.×5.5 in. actual dimension) but may, of course, be any dimensions, such as 2×4 or 2×8.

Figure 2:
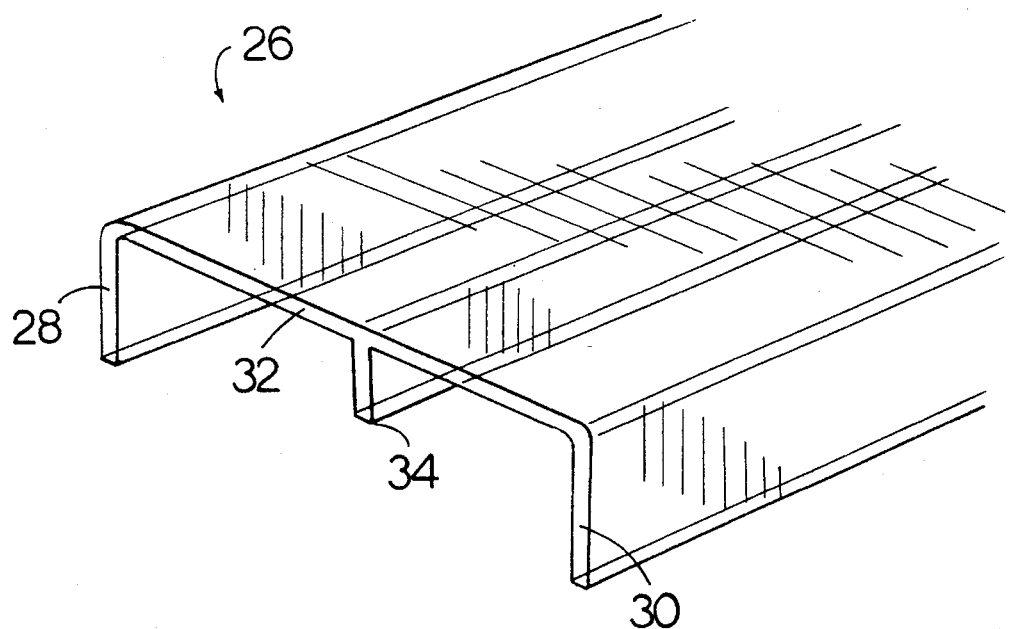
FIG. 2 is a perspective view of the preferred embodiment of a light-transmissive decking section of the present invention having an E-shaped cross-section.

FIG. 2 shows a light-transmissive decking section 26 of the present invention. The light-transmissive decking section 26 has a first side 28, a second side 30, and a top section 32. The light-transmissive decking section 26 is also provided with a support rib 34 secured to and depending from the top section 32 between the first side 28 and the second side 30. This support rib 34 gives the light-transmissive decking section 26 an E-shaped cross section. The light-transmissive decking section 26 is preferably transparent and made from an extruded polycarbonate, which gives the light-transmissive decking section 26 superior strength and durability characteristics. It should be noted, however, that the light-transmissive decking section 26 may be made from acrylic, glass or any strong, light-transmissive material. The polycarbonate is preferably ⅛–¼ inch thick and the light-transmissive decking section 26 is preferably 1–3 feet long. It should be noted that the light-transmissive decking section 26 may be provided in any length required, as long as adequate support is provided for the light-transmissive decking section 26. The light-transmissive decking section 26 is flush-fitting and mimics the dimensions of the existing decking 18 for an aesthetically pleasing integration with same. The light-transmissive decking section 26 is the same height as the existing decking 18 to provide a safe walking surface for users.

Figure 3:
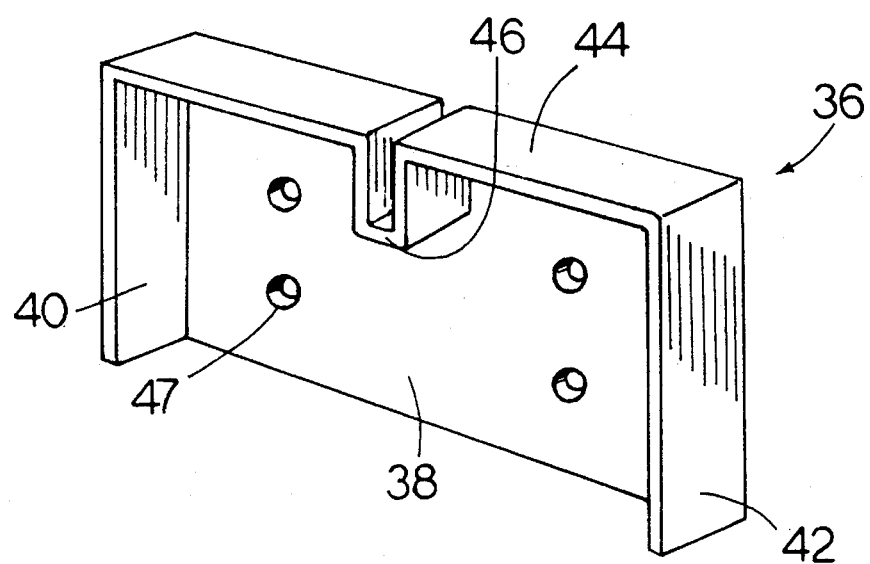
FIG. 3 is a perspective view of a bracket which holds light-transmissive decking section of FIG. 2 in place.
Figure 4:
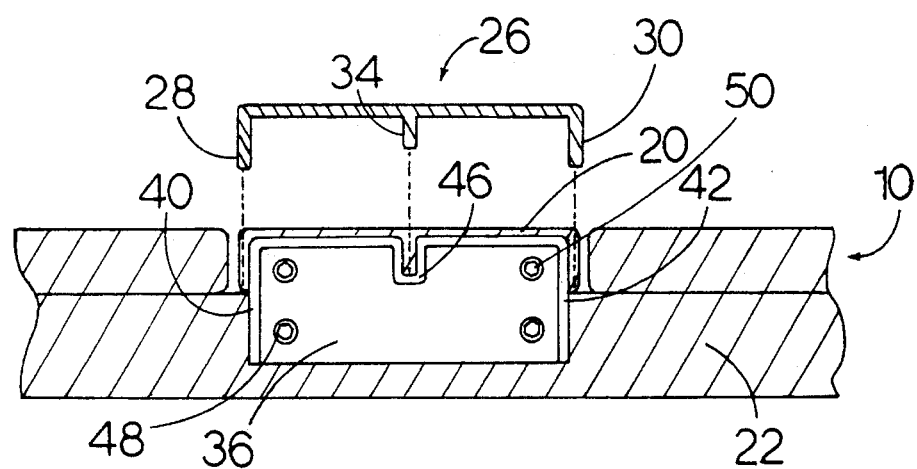
FIG. 4 is a cross-sectional elevational view showing the bracket of FIG. 3 attached to a wooden decking member and a joist member of a deck, with the light-transmissive decking section of FIG. 2 shown exploded away from the bracket.

Support for the light-transmissive decking section 26 is provided by a bracket 36 as shown in FIG. 3. The bracket 36 is provided with a rear wall 38, a first side 40, a second side 42 and a top 44. Unlike typical deck hardware, the bracket 36 is preferably die-cast out of aluminum, instead of being stamped out of galvanized steel, since the bracket 36 will be visible to users of the decking assembly 10 (FIGS. 1 and 3). Galvanized steel, injection molded graphite composite, polycarbonate, or even polyvinyl chloride may be used for the bracket. The rear wall 38 of the bracket 36 is provided with four bolt holes 47 which allow the bracket 36 to be mounted to the transverse joists 22 and decking sections 20 of the decking assembly 10 (FIGS. 3 and 4). The top 44 is formed with a recess 46 to accommodate the support rib 34 of the light-transmissive decking section 26.

Figure 5:
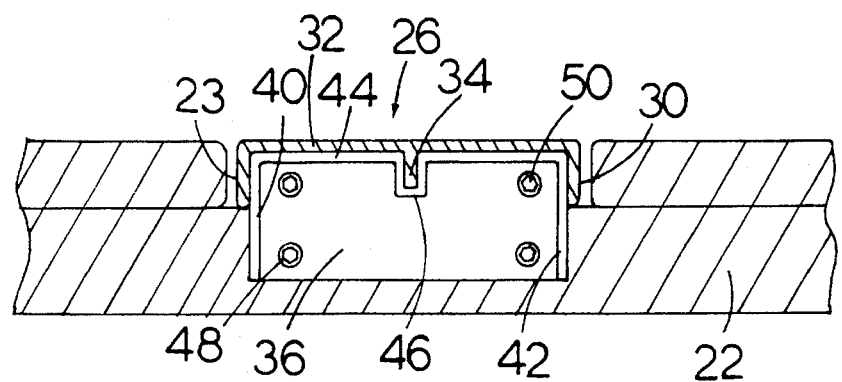
FIG. 5 is a cross-sectional elevational view showing the light-transmissive decking section of FIG. 4 in place.

In the preferred embodiment of the present invention, two brackets 36 are secured to the decking sections 20 and the transverse joists 22 approximately 3 feet apart (FIG. 1). The light-transmissive decking section 26 is then laid over both of the brackets 36 with the sides 20 and 30 of the light-transmissive decking sections 26 supported by sides 40 and 42 of the bracket 36 (FIGS. 1 and 5). Since the connection of the light-transmissive decking section 26, to the bracket 36, to the rest of the decking assembly 10 is the same for both ends of the light-transmissive decking section 26, description will be limited to only one end of the light-transmissive decking section 26 for the sake of clarity.

Figure 6:
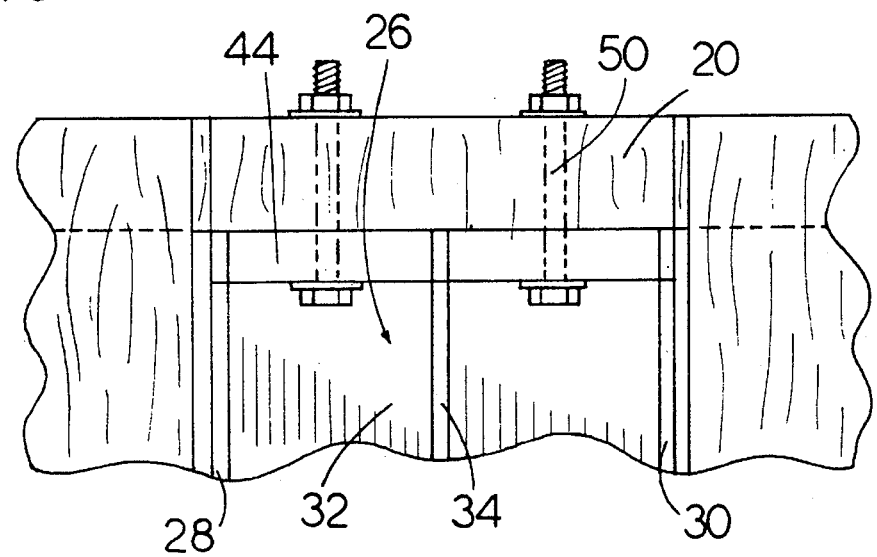
FIG. 6 is a top-plan view of FIG. 5.

As shown in FIG. 5, the bracket 36 is bolted to the decking assembly 10. A pair of lower bolts 48 are secured to one of the transverse joists 22 while a pair of upper bolts 50 are secured to one of the wooden decking sections 20. The light-transmissive decking section 26 is positioned above the bracket 36 with the first side 28 of the light-transmissive decking section 26 extending over the first side 40 of the bracket and the second side 30 of the light-transmissive decking section 26 extending over the second side 42 of the bracket 36. Additionally, the support rib 34 is positioned within the recess 46 of the bracket 36. As shown in FIGS. 5 and 6, the top section 32 of the light-transmissive decking section 26 rests on the top 44 of the bracket 36 while the sides 28 and 30 of the light-transmissive decking section 26 rest on the transverse joist 22. The support rib 34 of the light-transmissive decking section 26 rests within the recess 46 of the bracket 36 and acts, along with the sides 28 and 30 of the light-transmissive decking section 26, to brace the light-transmissive decking section 26 against the bracket 36 to prevent transverse movement of the light-transmissive decking section 26 in relationship to the bracket 36.

Figure 7:
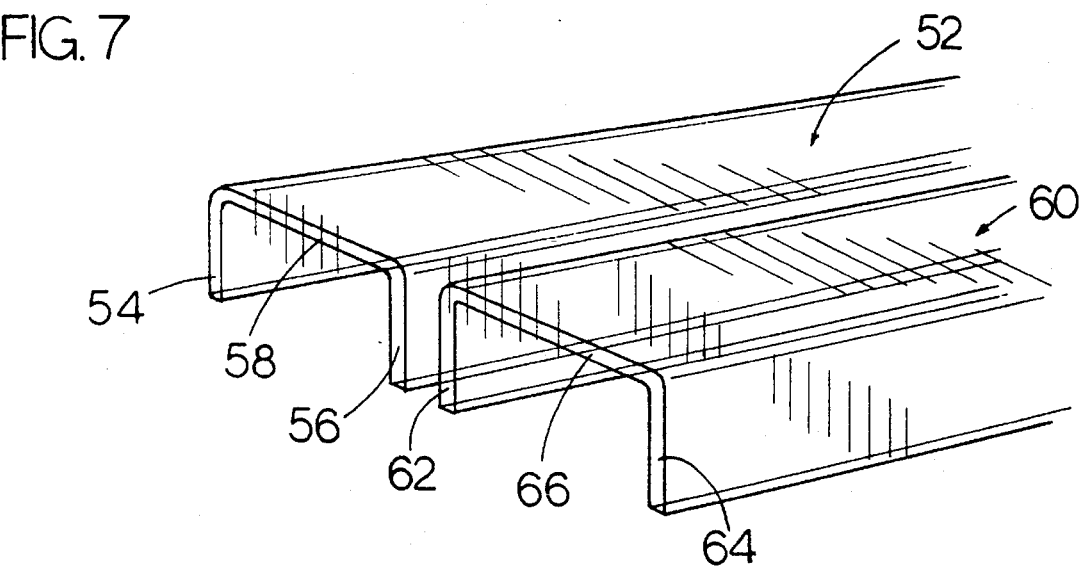
FIG. 7 is a perspective view of an alternative preferred embodiment of the present invention wherein the light-transmissive decking sections have C-shaped cross-sections.
Figure 8:
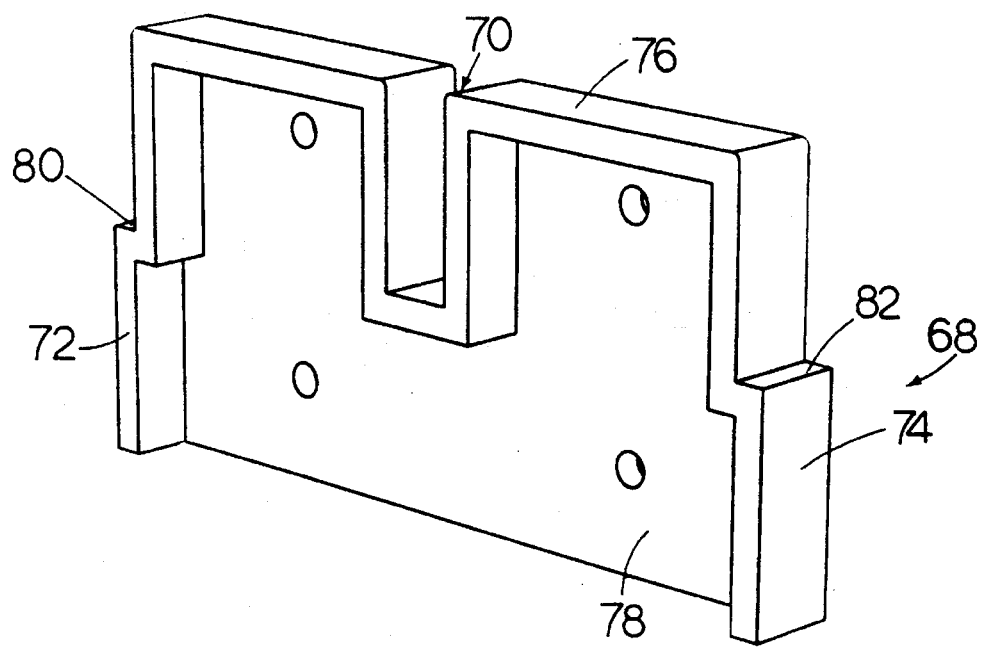
FIG. 8 is a perspective view of an alternative bracket which holds the light-transmissive decking sections of FIG. 7 in place.
Figure 9:
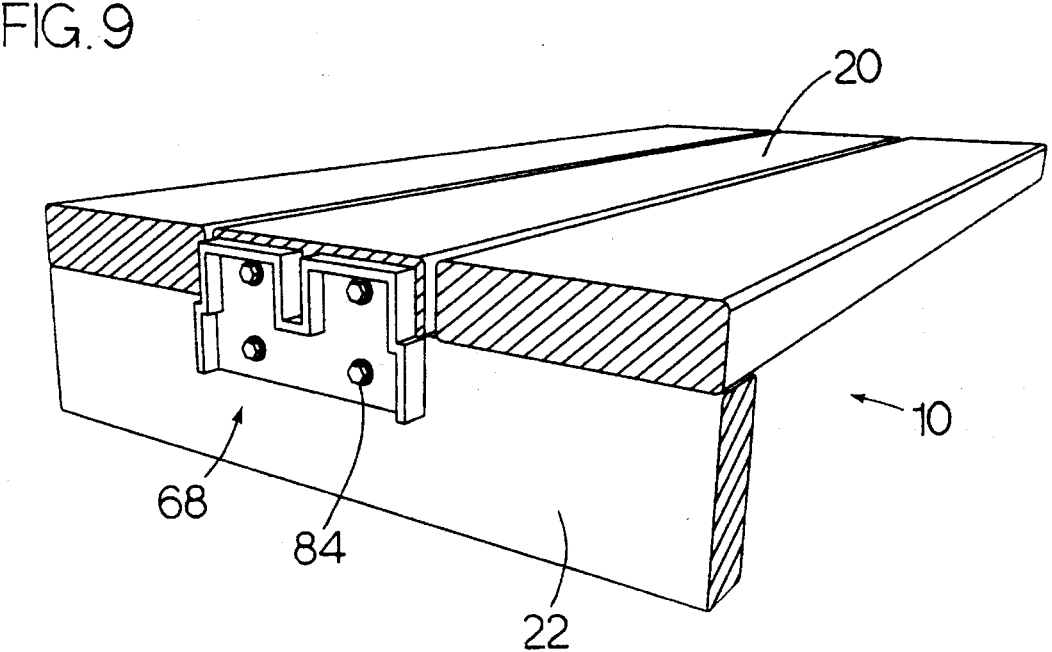
FIG. 9 is a perspective view showing the bracket of FIG. 8 secured to a wooden decking member and a joist member of a deck.
Figure 10:
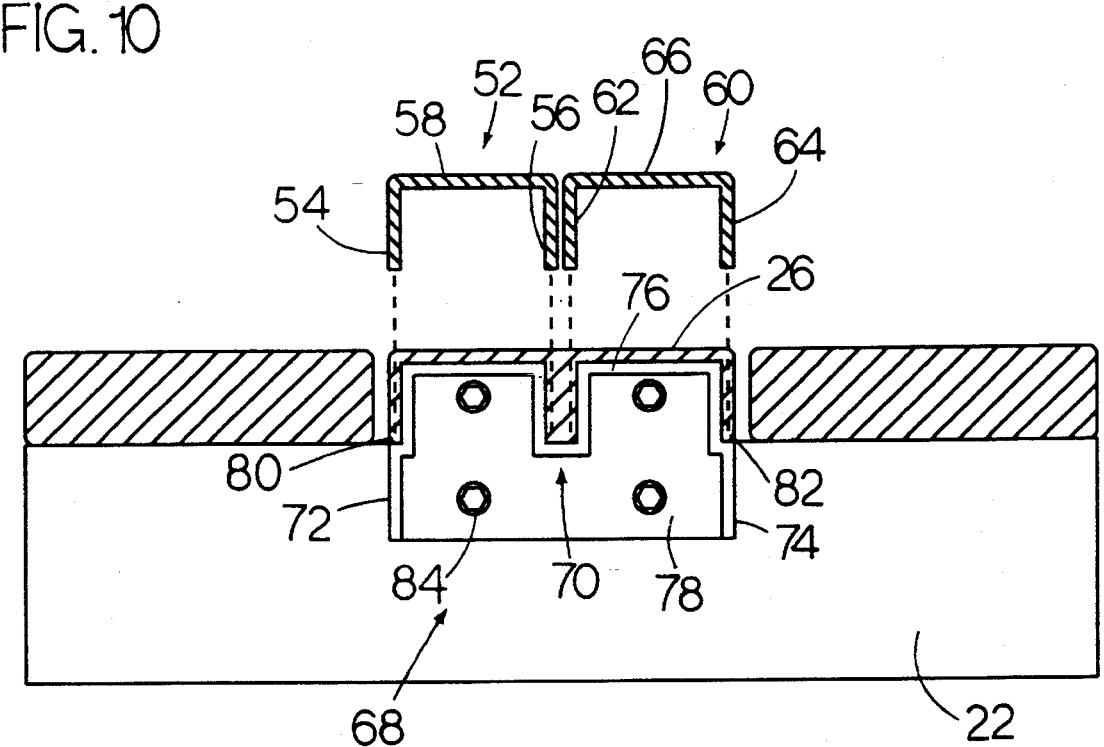
FIG. 10 is a cross-sectional elevational view of FIG. 9 with the light-transmissive decking sections of FIG. 7 shown exploded away from the bracket.
Figure 20:
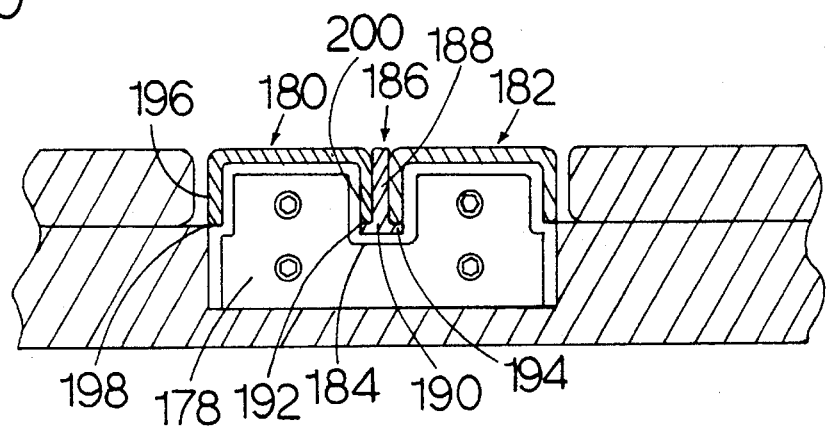
FIG. 20 is a cross-sectional elevational view of an alternative embodiment of the present invention having a second support bracket with an inverted T-shaped cross-section.

FIG. 7 shows an alternative embodiment of the present invention having a first light-transmissive section 52 with a first side 54, a second side 56, and a top 58 and a second light-transmissive section 60 having a first side 62, a second side 64, and a top 66. These narrower light-transmissive sections 52 and 60 are used in conjunction with a modified bracket 68 having a deeper recess 70 (FIGS. 8 and 20). The modified bracket 68 is provided with a first side 72, a second side 74, a top 76, and a rear wall 78. The sides 72 and 74 of the modified bracket 68 are preferably provided with shoulders 80 and 82 to support the first side 54 of the first light-transmissive section and the second side 64 of the second light-transmissive section 60 (FIGS. 7 and 8). As shown in FIG. 9, the modified bracket 68 is secured to the decking assembly 10 with bolts 84 so that the modified bracket 68 is supported by both the decking section 20 and the transverse joist 22. In FIG. 10, the first and second light-transmissive sections 52 and 60 are shown exploded away from the modified bracket 68 with the second side 56 of the first light-transmissive section 52 and the first side 62 of the second light-transmissive section 60 poised above the recess 70 of the modified bracket 68.

Figure 11:
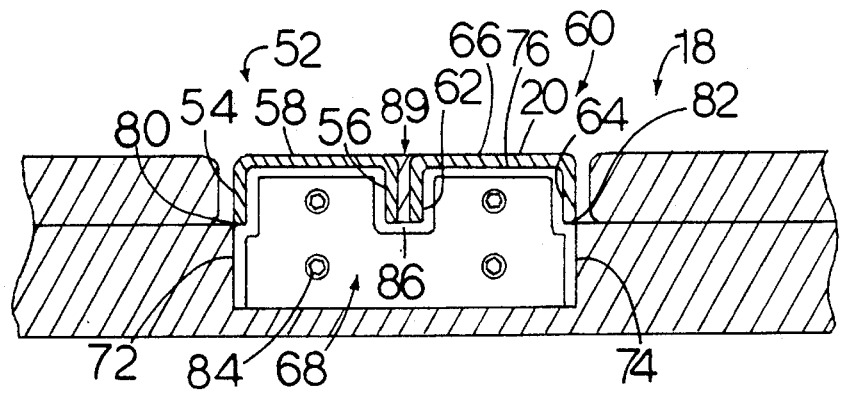
FIG. 11 is a cross-sectional elevational view showing the light-transmissive decking sections of FIG. 10 in place.
Figure 12:
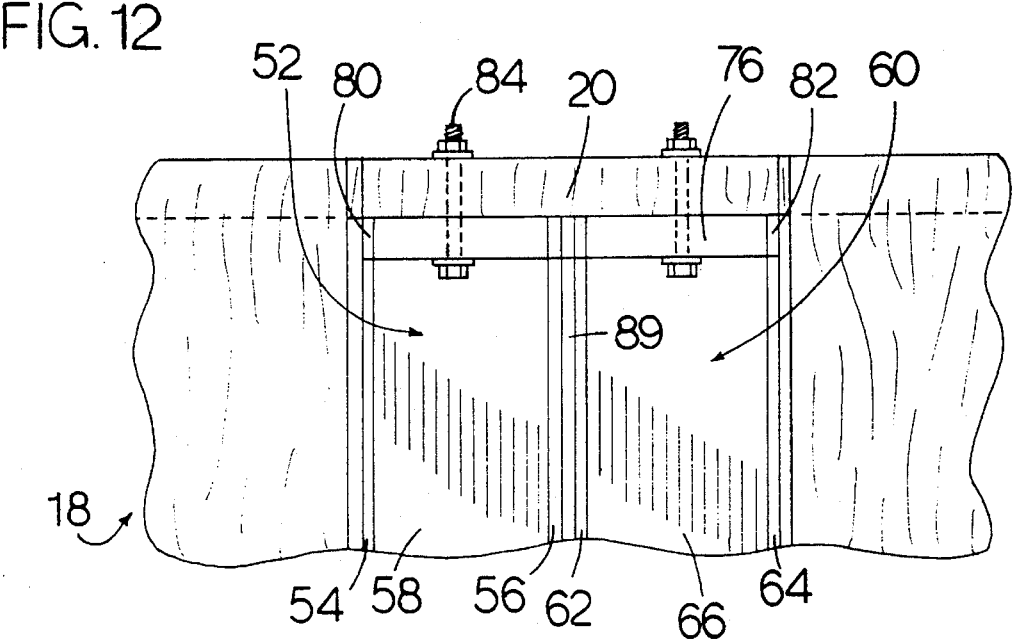
FIG. 12 is a top-plan view of FIG. 11.

As shown in FIG. 11, when the light-transmissive sections 52 and 60 are placed on the modified bracket 68, the tops 58 and 66 of the light-transmissive sections 52 and 60 are supported by the top 76 of the modified bracket 68. Additionally, the first side 54 of the first light-transmissive section 52 is supported by the first shoulder 80 of the modified bracket 68 while the second side 56 of the first light-transmissive section 52 is supported by a bottom 86 of the recess 70 of the modified bracket 68. Similarly, the first side 62 of the second light-transmissive section 60 is supported by the bottom 86 of the recess 70 of the modified bracket 68 while the second side 64 of the second light-transmissive section 60 is supported by the second shoulder 82 of the modified bracket 68. When the light-transmissive sections 52 and 60 have been placed onto the bracket 68, there is an open space 89 between the sections 52 and 60 which allows water to drain from the decking 18 (FIGS. 11 and 12).

Figure 13:
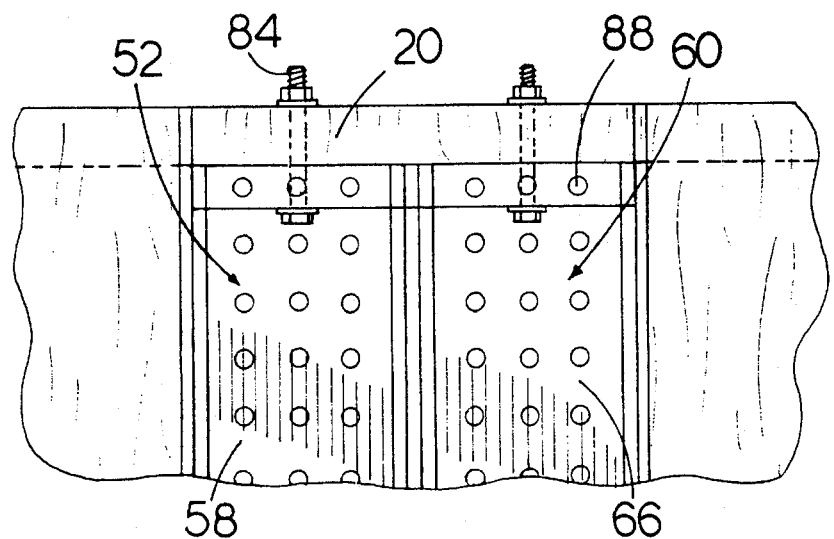
FIG. 13 is a top-plan view similar to FIG. 12 in which non-skid adhesive circular members have been attached to the light-transmissive decking sections.

FIG. 13 shows the top 58 of the first light-transmissive section 52 and the top 66 of the second light-transmissive section 60 covered with circular non-skid members 88. The circular non-skid members 88 are preferably flexible, having an adhesive underside and an irregular top side. The circular non-skid members 88 are placed on the first light-transmissive section 52 and second light-transmissive section 60 with the adhesive side down so that the circular non-skid members 88 are secured to the light-transmissive sections 52 and 60. While it is desirable to provide circular non-skid members 88 with an irregular top side to prevent a user from slipping on the light-transmissive sections 52 and 60, it is also desirable that the circular non-skid members 88 are relatively thin to decrease the chance of a user tripping and falling after contacting the circular non-skid members 88.

Figure 14:
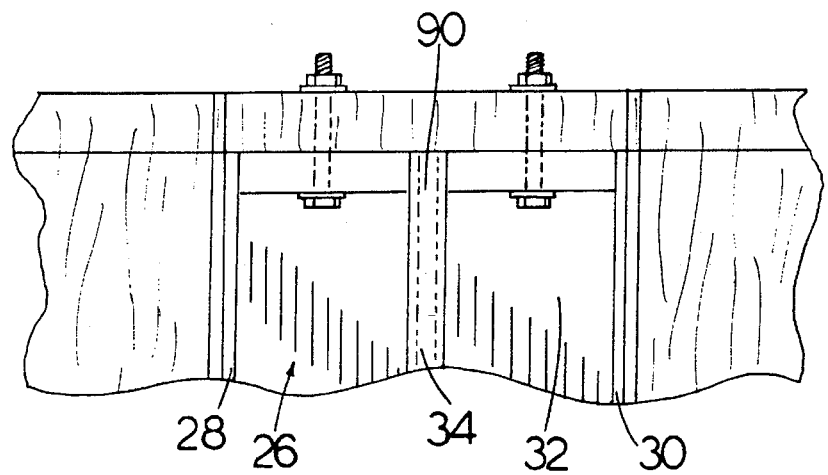
FIGS. 14 is a top-plan view similar to FIG. 12 in which a non-skid adhesive skid member has been placed between the light-transmissive decking sections.

FIG. 14 shows an alternative embodiment of a non-skid member applied to the large light-transmissive decking section 26 of FIG. 2 having the support rib 34. In this embodiment, a non-skid strip 90 is affixed down the center of the top section 32 of the light-transmissive decking section 26 by an adhesive or some other securement means. In this embodiment, the non-skid strip 90 serves the dual purpose of adding non-skid properties to the light-transmissive decking section 26 while hiding the support rib 34 from direct view of a user.

Figure 15:
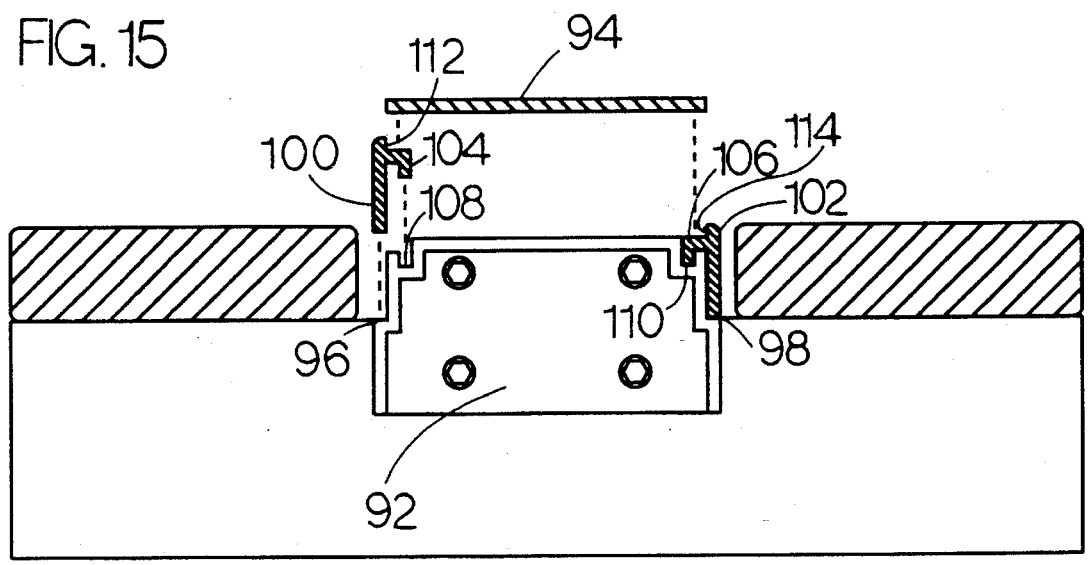
FIG. 15 is a cross-sectional elevational view showing a bracket of an alternative embodiment of the present invention with a side section and an alternative light-transmissive top decking section shown exploded away from the bracket.

FIG. 15 shows another alternative embodiment of the present invention having a specialized bracket 92 and light-transmissive surface 94. The specialized bracket 92 is provided with a pair of shoulders 96 and 98 to support a first side section 100 and a second side section 102. The side sections 100 and 102 are provided with flanges 104 and 106 which are coextensive in length with the side sections 100 and 102. The specialized bracket 92 is provided with a pair of side recesses 108 and 110 designed to receive the flanges 104 and 106. When the side sections 100 and 102 are placed on the specialized bracket 92, the flanges 104 and 106 and the side recesses 108 and 110 secure the side sections 100 and 102 against lateral displacement relative to the specialized bracket 92. The light-transmissive surface 94 is coextensive in length with the side sections 100 and 102 and fits within channels 112 and 114 provided along the lengths of the side sections 100 and 102. Since the side sections 100 and 102 are braced against lateral displacement by the specialized bracket 92, the light-transmissive surface 94 fitting within the channels 112 and 114 of the side sections 100 and 102 is also secured against lateral displacement. While somewhat more costly than the aforementioned embodiments, this embodiment of the invention allows the use of steel or aluminum side sections 100 and 102 to more securely support the light-transmissive surface 94. Accordingly, a larger light-transmissive surface 94 may be used without the use of a support rib. Furthermore, because the light-transmissive surface 94 can be simply a standard planar piece of polycarbonate, the cost of the light-transmissive surface 94 is less than that for the aforementioned embodiment.

Figure 16:
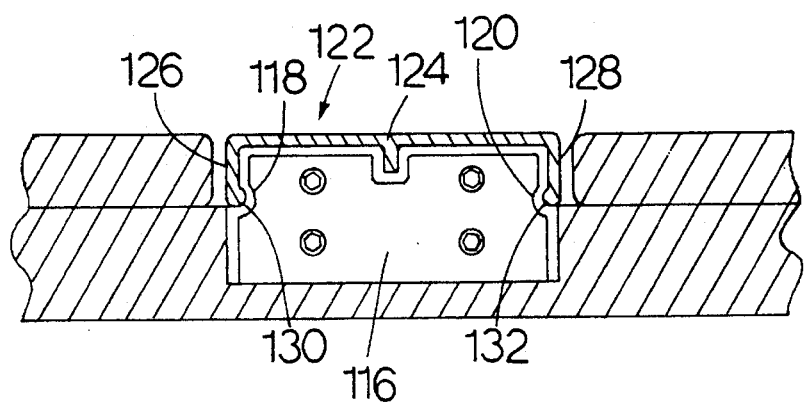
FIG. 16 is a cross-sectional elevational view of an alternative embodiment of the present invention in which ridges are located on the inside of the legs of the light-transmissive decking section which correspond to detents on the outside of the legs of the bracket for a snap-fit arrangement.

FIG. 16 shows yet another alternative embodiment of the present invention, wherein a bracket 116 is provided with detents 118 and 120. A light-transmissive decking section 122 is provided, having a top 124, a first side 126 and a second side 128. The ends of the side 126 and 128 are provided with ridges 130 and 132 which "snap" into the detents 118 and 120 of the bracket 116 when the light-transmissive decking section 122 is placed on the bracket 116. This embodiment of the invention allows the light-transmissive decking section 122 to be securely fastened to the bracket 116 without the use of adhesives or bolts.

Figure 17:
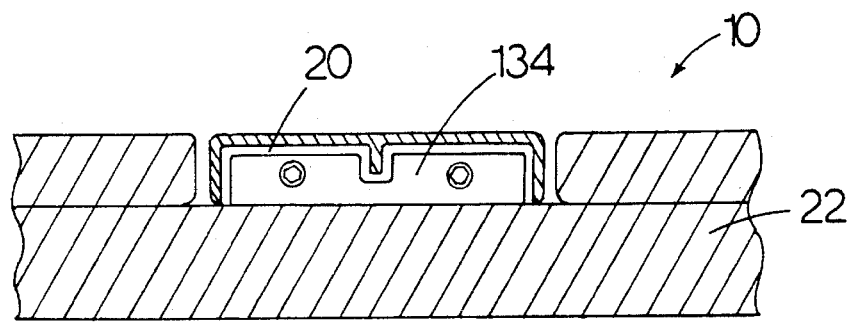
FIG. 17 is a cross-sectional elevational view of an alternative embodiment of the present invention showing a modified bracket which is only secured to the decking member.

FIG. 17 shows still another embodiment of the present invention, wherein a bracket 134 is secured to a decking section 20 and rests on a transverse joist 22. A light-transmissive decking section 136 is placed over the bracket 134 so that the light-transmissive decking section 136 rests on the bracket 134 and the transverse joist 22. Since the bracket 134 is only secured to the decking section 20, the bracket 134 is much smaller and therefore less costly. Furthermore, because the bracket 134 is smaller it is more aesthetically pleasing and adds to the beauty of the entire decking assembly 10.

Figure 18:
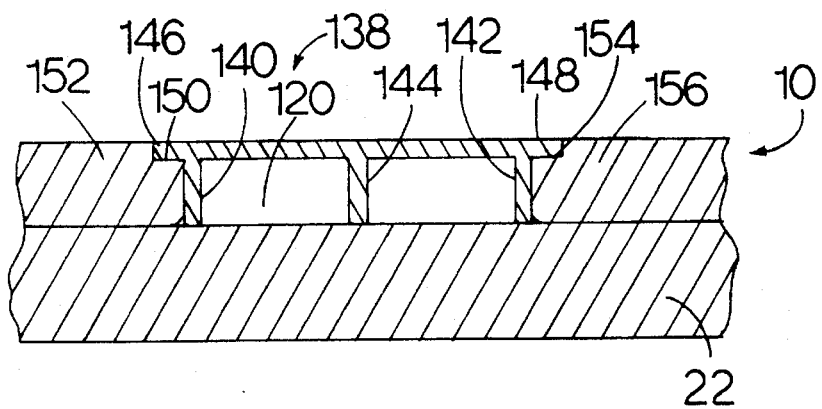
FIG. 18 is a cross-sectional elevational view of an alternative embodiment of the present invention showing a bracketless light-transmissive decking section which fits into recesses in the tops of adjacent wooden decking members.

Still another embodiment of the present invention is shown in FIG. 18. A light-transmissive decking section 138 is provided with a first side 140, a second side 142 and a support rib 144 which is as deep as the sides 140 and 522142. Instead of a bracket, the light-transmissive decking section 138 is provided with a first flange 146 and a second flange 148 which are perpendicular to and coextensive in length with the sides 140 and 142. A first recess 150 is provided in a first decking section 152 and a second recess 154 is provided in a second decking section 156. The first flange 146 and second flange 148 of the light-transmissive decking section 138 are placed within the first recess 150 and second recess 154 of the decking sections 152 and 156. The sides 140 and 142, along with the support rib 144, rest on the transverse joist 22, thereby lending added support to the light-transmissive decking section 138. Although this embodiment of the invention requires more preparation of the decking assembly 10, the elimination of any bracket increases the aesthetics of the entire decking assembly 10.

Figure 19:
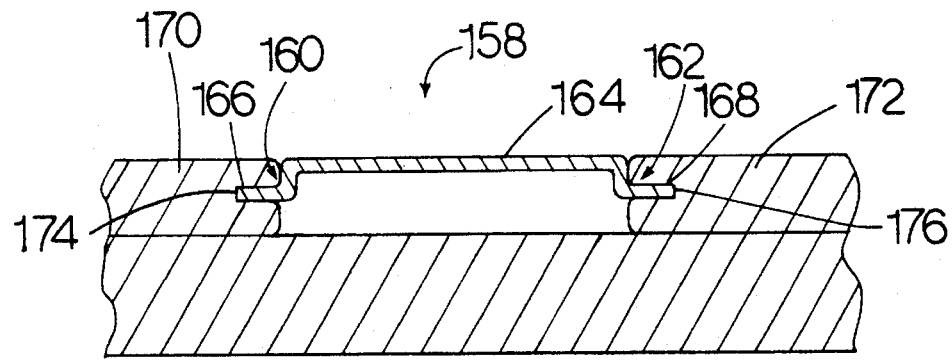
FIG. 19 is a cross-sectional elevational view of an alternative embodiment of the present invention showing a bracketless light-transmissive decking section which fits into recesses in the sides of adjacent wooden decking members.

FIG. 19 shows an alternative embodiment of the invention with a light-transmissive decking section 158 having a first side 160 and a second side 162. Instead of extending directly downward from a top section 164, however, the sides 160 and 162 extend outward parallel to the top section 164 to form a pair of end flanges 166 and 168. A first decking section 170 and a second decking section 172 are provided with recesses 174 and 176 equal in width to the width of the flanges 166 and 168. The flanges 166 and 168 of the light-transmissive decking section 158 are secured within the recesses 174 and 176 of the first decking section 170 and second decking section 172. The lightweight nature of this light-transmissive decking section 158, along with the elimination of the bracket, make this an excellent choice for new construction, since the first decking section 170 and second decking section 172 can be pre-routed with recesses 174 and 176 before being shipped to the construction site.

Figure 21:
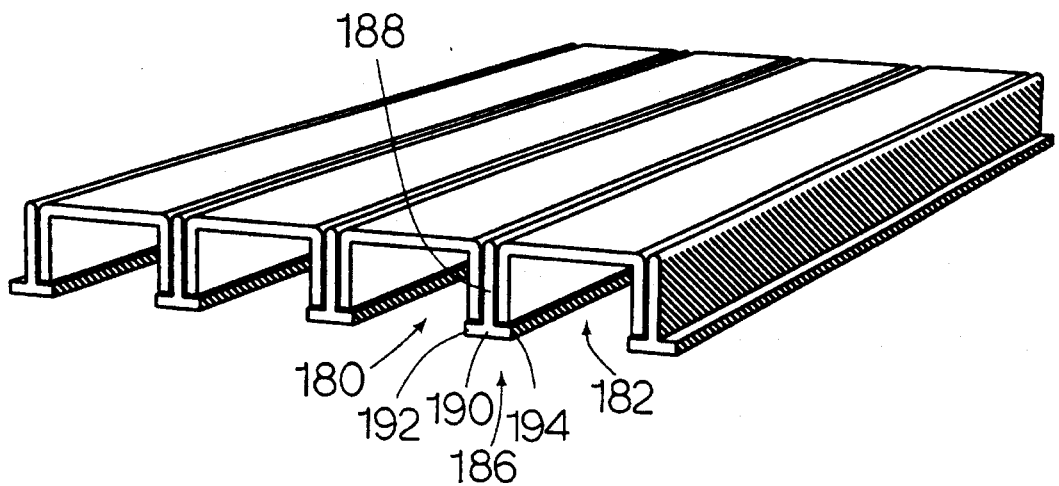
FIG. 21 is a perspective view showing the alternative embodiment of FIG. 20 showing a plurality of light-transmissive decking sections and support brackets having inverted T-shaped cross-sections.

FIGS. 20 and 21 show an alternative embodiment of the present invention which allows a plurality of light-transmissive decking sections to be placed adjacent to one another. A bracket 178, a first light-transmissive decking section 180, and a second light-transmissive decking section 182 similar to those shown in FIG. 10 are provided. The bracket 178, however, is provided with a wider recess 184 which accommodates a support bracket 186. As shown in FIG. 21, the support bracket 186 has a vertical body 188 coextensive in length with the light-transmissive decking sections 180 and 182. The support bracket 186 is also provided with a foot 190 secured perpendicularly to the body 188 and coextensive in length with the body 188. The body 188 is secured to the center of the foot 190 to create a pair of flanges 192 and 194. The end of the foot 190 is provided within the recess 184 of the bracket 178 and is thereby supported by the bracket 178 (FIG. 20). Once the support bracket 186 is in place, the first light-transmissive decking section 180 is placed on the bracket 178 with a first side 196 of the first light-transmissive decking section 180 supported by a shoulder 198 of the bracket 178. A second side 200 of the first light-transmissive decking section 180 rests along its entire length on the first flange 192 of the foot 190 of the support bracket 186. The second light-transmissive decking section 182 is installed in a similar fashion.

Figure 22:
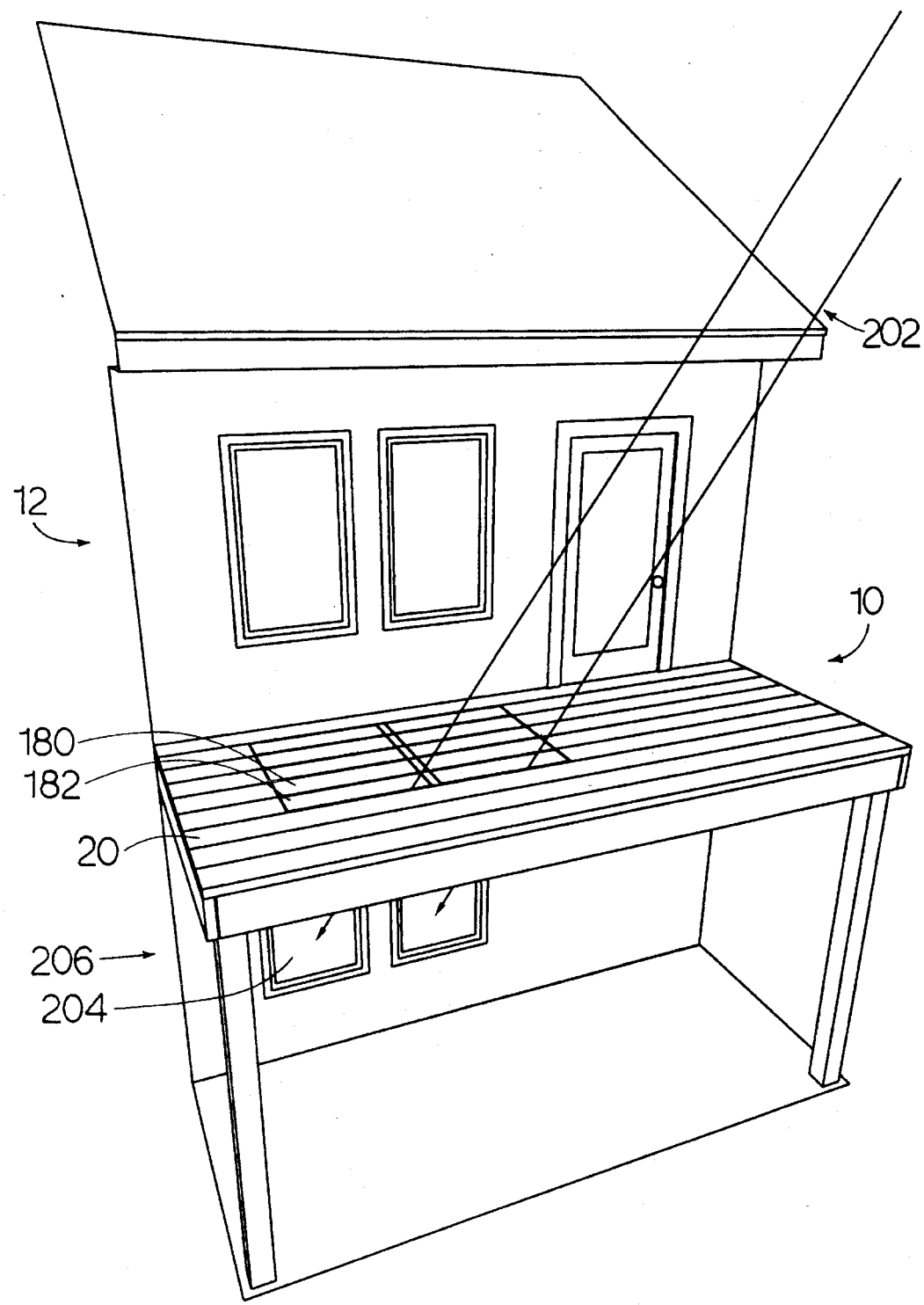
FIG. 22 is a perspective view of the decking assembly of the present invention showing the light-transmissive decking sections arranged contiguous with one another.

The use of the support bracket 186 is particularly useful in a situation such as that shown in FIGS. 21 and 22 where a plurality of light-transmissive decking sections 180 and 182 are placed next to one another. The support bracket 186 provides added stability and support when the light-transmissive decking sections 180 and 182 are not surrounded on both sides by standard wooden decking sections 20. Not only does the placement of light-transmissive decking sections 180 and 182 next to one another increase the aesthetic value of the decking assembly 10, but the larger light-transmissive area allows sunlight 202 to pass through the decking assembly 10 and on through windows 204 provided in the first floor 206 of the home 12. This allows the sunlight 202 to be used within the first floor 206 of the home for heat and illumination. A standard deck without light-transmissive decking would not allow sunlight 202 to pass through the decking assembly and would therefore preclude the reception of sunlight through a lower story window placed under a deck. Additionally, because rays of sunlight 202 are received at a more acute angle in the winter months, the light-transmissive decking sections 180 and 182 can be strategically placed so that sunlight 202 contacts the windows 204 on the first floor 206 during the winter and contacts the ground during the summer. Such a placement would decrease energy use within the home 12 during both winter and summer months.

Figure 23:
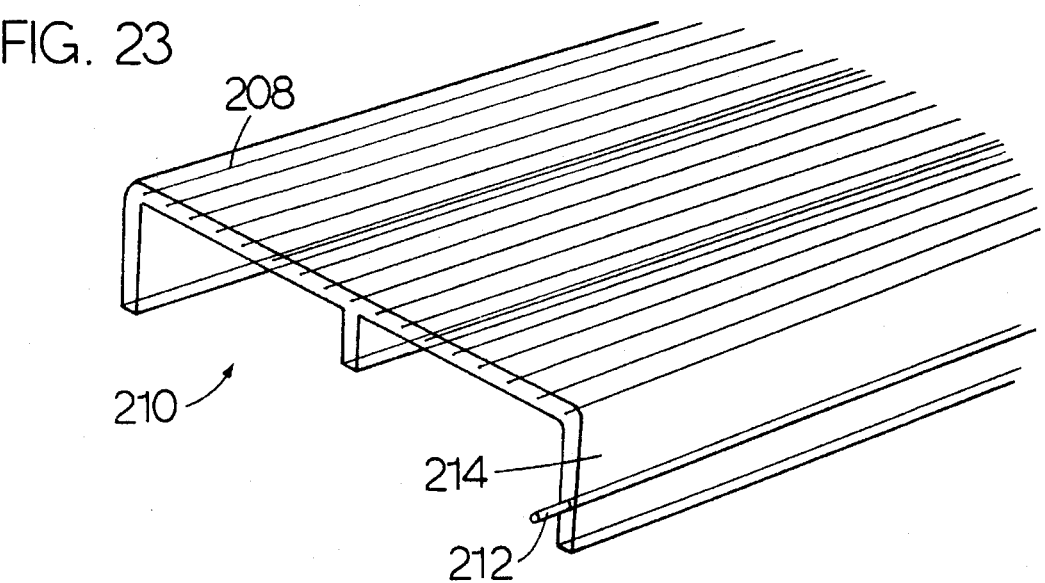
FIG. 23 is a perspective view of an alternative embodiment of the present invention showing steel wire reinforcements and an insulated electrical conductive wire molded into a light-transmissive decking section.

FIG. 23 shows an alternative embodiment of the present invention wherein steel wire 208 is embedded in a polycarbonate light-transmissive decking section 210. The steel wire 208 adds strength and durability to the light-transmissive decking section 210 without significantly increasing the weight or cost of the light-transmissive decking section 210. FIG. 23 also shows an insulated wire 212 running along a side 214 of the light-transmissive decking section 210 to supply electricity to be used on the decking assembly 10. The electricity may be used for illumination of the decking assembly 10 or as an energy supply for various appliances (not shown) to be used on the decking assembly 10. A fiber optic cable (not shown) may be substituted for the insulated wire 212 if it is desired to transmit light through the side 214 of the light-transmissive decking section 210 to be used for illumination or information transmission.

Figure 24:
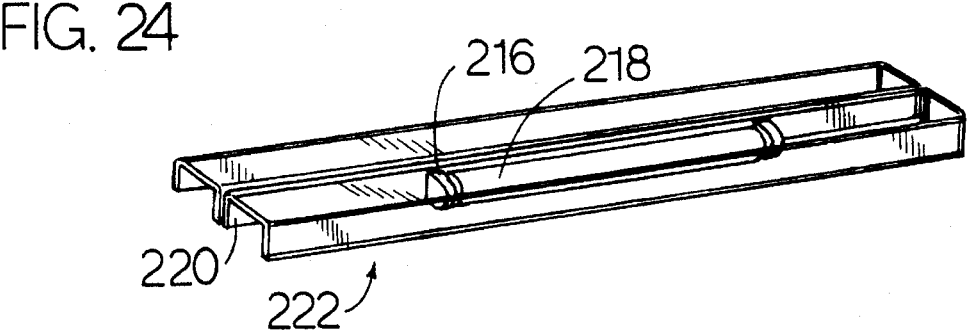
FIG. 24 is a perspective view of an alternative embodiment of the present invention showing two light-transmissive decking sections having C-shaped cross-sections into one of which a fluorescent light is located in the channel between the two leg members of the light-transmissive decking section.
Figure 25:
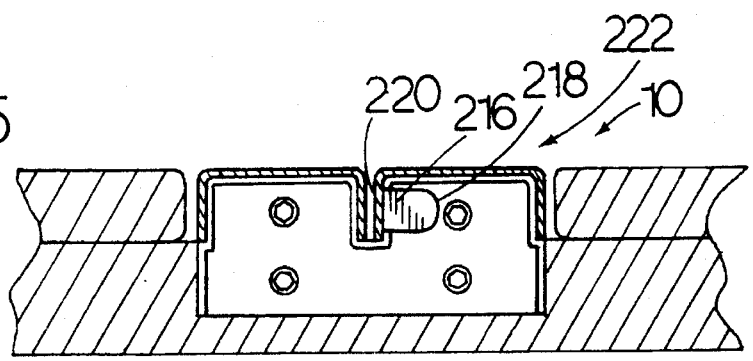
FIG. 25 is a cross-sectional elevational view of the light-transmissive decking section of FIG. 24 showing the fluorescent light in place and a bracket attached to a wooden decking member and a joist member of the deck.

FIG. 24 shows yet another alternative embodiment of the present invention wherein a fluorescent light fixture 216 and a bulb 218 are secured to an interior side 220 of a light-transmissive decking section 222. As shown in FIG. 25, both the fixture 216 and bulb 218 are provided within the confines of the light-transmissive decking section 222 to prevent hazards associated with exposed lights. The placement of the fixture 216 and bulb 218 along the side 220 of the light-transmissive decking section 222 allows light to be transmitted both above and below the light-transmissive decking section 222 to illuminate not only the area above the decking assembly 10, but also that area below the decking assembly 10.

Figure 26:
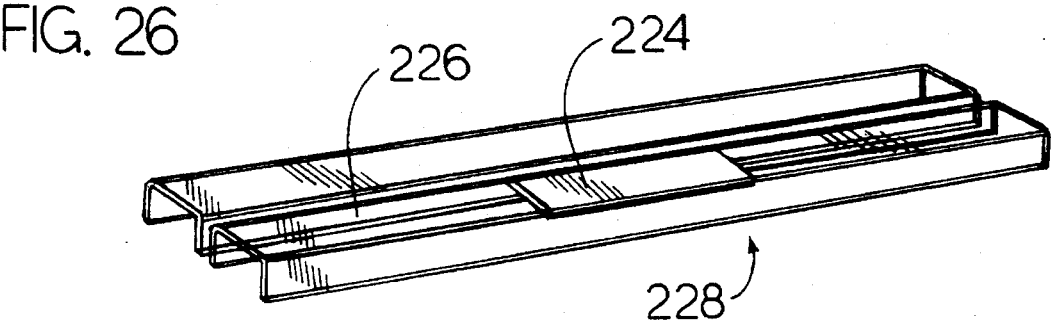
FIG. 26 is a perspective view of an alternative embodiment of the present invention showing two light-transmissive decking sections having C-shaped cross-sections into one of which a solar collector panel is located in the channel between the two leg members of the light-transmissive decking section.
Figure 27:
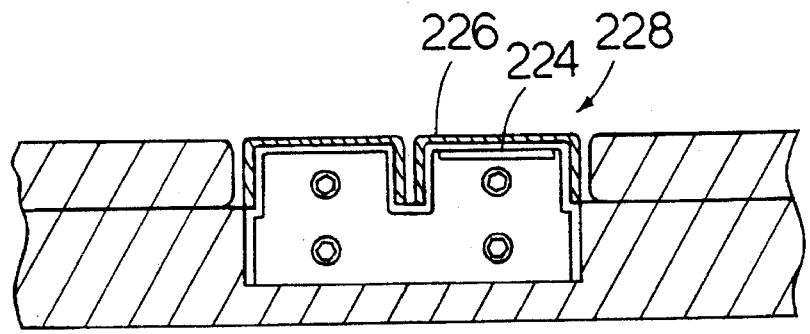
FIG. 27 is a cross-sectional elevational view of the light-transmissive decking section of FIG. 26 showing the solar collector panel in place and a bracket attached to a wooden decking member and a joist member of the deck.

An additional embodiment of the present invention is shown in FIGS. 26 and 27. A solar collector panel 224 is secured to a top section 226 of a light-transmissive decking section 228 to allow the conversion of light rays into energy, while protecting the solar panel 224 from damage. The embodiments shown in FIGS. 24 and 26 may be combined so that the solar panel 224 collects energy during the day which is used to run the light 218 at night.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, while the light-transmissive decking section 26 is shown to span the distance between two transverse joists 22, it is anticipated that a light-transmissive decking section could actually span several transverse joists with obvious modification.

What is claimed is:

1. A light-transmissive decking section for allowing the passage of light through a deck, said light-transmissive decking section comprising:
   (a) a substantially planar top section of a uniform width, said top section being constructed of a light-transmissive material which allows light to pass through the decking section, said top section having a first end and a second end, said top section also having a first edge and a second edge located transversely of said first end and said second end;
   (b) a first side section having a first end and a second end and being coextensive in length with said top section, said first side section operably connected to said top section along said first edge to buttress said top section against lateral displacement;
   (c) a second side section having a first end and a second end and being coextensive in length with said top section, said second side section operably connected to said top section along said second edge to buttress said top section against lateral displacement; and
   (d) means for securing said light-transmissive decking section into place on said deck, wherein said securing means is a bracket secured to said deck, and in supporting engagement with said light-transmissive decking section.

2. The light-transmissive decking section of claim 1, wherein said bracket is in supporting engagement with said top section of said light-transmissive decking section.

3. The light-transmissive decking section of claim 1, wherein said bracket has a foot and a body centered on and secured perpendicularly to said foot, wherein said first side of said light-transmissive decking section is in supported engagement with said foot, and wherein said body is in lateral contact with said first side of said light-transmissive decking section to prevent lateral displacement of said first side of said light-transmissive decking section.

4. The light-transmissive decking assembly of claim 1, further comprising releasable locking means for releasably locking said light-transmissive decking section to said bracket.

5. The light-transmissive decking assembly of claim 4, wherein said locking means comprises:
   (a) at least two detents formed in said bracket;
   (b) a first flange provided on said first side section of said light-transmissive decking section; and
   (c) a second flange provided on said second side section of said light-transmissive decking section.

6. The decking assembly of claim 1, wherein said first and second sides of said light-transmissive decking section are releasably connected to said top section.

7. The light-transmissive decking section of claim 1, further comprising a support rib co-extensive in length with said top section, centrally located between said first side and said second side of said light-transmissive decking section, and depending from said top section of said light-transmissive decking section.

8. The decking assembly of claim 7, wherein said bracket is provided with a recess, wherein said light-transmissive decking section is connected to said bracket with said support rib received within said recess to brace said support rib against lateral displacement.

9. The light-transmissive decking section of claim 1, said bracket having a foot, a first end, a second end, and a body having a first side and a second side, wherein said body is secured perpendicular to said foot, wherein said second side section is in supported engagement against lateral displacement with said first side of said body of said bracket and wherein said second side section of said light-transmissive decking section is in supported engagement with said foot of said bracket.

10. The light-transmissive decking section of claim 1, further comprising a strengthening material molded into said top section to add strength to said light-transmissive decking section.

11. The light-transmissive decking section of claim 1, further comprising a light source secured within said light-transmissive decking section.

12. The light-transmissive decking section of claim 1, further comprising a solar panel secured to said light-transmissive decking section.

13. The light-transmissive decking assembly of claim 1, further comprising a skid-resistant material secured to said top section of said light-transmissive decking section.

14. A light-transmissive decking section for allowing the passage of light through a deck, said light-transmissive decking section comprising: (a) a substantially planar top section of a uniform width, said top section being constructed of a light-transmissive material which allows light to pass through the decking section, said top section having a first end and a second end, said top section also having a first edge and a second edge located transversely of said first end and said second end; (b) a first side section having a first end and a second end and being coextensive in length with said top section, said first side section operably connected to said top section along said first edge to buttress said top section against lateral displacement; (c) a second side section having a first end and a second end and being coextensive in length with said top section, said second side section operably connected to said top section along said second edge to buttress said top section against lateral displacement; and (d) means for securing said light-transmissive decking section into place on said deck wherein said securing means is a first side flange secured to and extending outward from said first side section of said light-transmissive decking section and a second side flange secured to and extending outward from said second side section of said light-transmissive decking section.

15. The light-transmissive decking section of claim 14, wherein said first side flange and said second side flange are planar and co-extensive with said top section of said light-transmissive decking section.

16. The light-transmissive decking section of claim 14, further comprising a deck, wherein said deck is provided with a first recess equal in length and depth to said first side flange and a second recess equal in length and depth to said second side flange, wherein said first side flange is provided for supported engagement within said first recess, and wherein said second side flange is provided for supported engagement within said second recess.

17. A decking assembly for supporting a user, in which at least a portion of the assembly allows light to pass through the decking assembly to the user. The decking assembly comprising:
    (a) a deck supported above the ground and capable of supporting the user; and
    (b) a light-transmissive decking section secured to said deck, said decking section comprising:
        (i) a substantially planar top section of a uniform width, said top section being constructed of a light-transmissive material which allows light to pass through the decking section, said top section having a first end and a second end, said top section also having a first edge, and a second edge located transversely of said first end and said second end;
        (ii) a first side section having a first end and a second end and being co-extensive in length with said top section, said first side section operably connected to said top section along said first edge to buttress said top section against lateral displacement; and
        (iii) a second side section having a first end and a second end and being coextensive in length with said top section, said second side section operably connected to said top section along said second edge to buttress said top section against lateral displacement.

18. The light-transmissive decking assembly of claim 17, wherein said first side section of said light-transmissive decking section and said second side section of said light-transmissive decking section are in supported engagement with said deck.

19. The light-transmissive decking section of claim 17, further comprising means for supporting said top section against said deck to prevent displacement of said top section when weight is applied to said top section, wherein said supporting means is a bracket secured to said deck, and in supporting engagement with said light-transmissive decking section.

20. The light-transmissive decking assembly of claim 19, further comprising a second light-transmissive decking section comprising:
    (a) a substantially planar top section of a uniform width, said top section being constructed of a light-transmissive material which allows light to pass through the decking section, said top section having a first end and a second end, said top section also having a first edge, and a second edge located transversely of said first end and said second end;
    (b) a first side section having a first end and a second end and being co-extensive in length with said top section, said first side section operably connected to said top section along said first edge to buttress said top section against lateral displacement; and
    (c) a second side section having a first end and a second end and being co-extensive in length with said top section, said second side section operably connected to said top section along said second edge to buttress said top section against lateral displacement.

21. The light-transmissive decking assembly of claim 20, wherein said bracket is provided with a recess in which are received said second side of said decking section and said first side of said second decking section.

22. The light-transmissive decking assembly of claim 21, further comprising a support bracket having a foot, a first end, a second end, and a body having a first side and a second side, wherein said body is centered on and secured perpendicular to said foot, wherein said first end is positioned within said recess of said bracket in supported engagement with said bracket, wherein said second side section of said light-transmissive decking section is supported against lateral displacement between said first side of said body and said bracket, and wherein said first side section of said second light-transmissive decking section is supported against lateral displacement between said second side of said body and said bracket.

* * * * *